United States Patent 3,424,775
Jan. 28, 1969

3,424,775
STABILIZING BIS(TRIORGANOTIN)OXIDES WITH PHENYL SALICYLATES
Hiroya Ito, Nishinomiya-shi, Hyogo-ken, and Takao Saisho, Nishimuko, Amagasaki-shi, Hyogo-ken, Japan, assignors to Nitto Kasei Co., Ltd., Osaka, Japan, a corporation of Japan
No Drawing. Filed Sept. 15, 1965, Ser. No. 487,576
U.S. Cl. 260—429.7
Int. Cl. C07f 7/22; C09d 5/14
6 Claims

ABSTRACT OF THE DISCLOSURE

A process for rendering organotin compound having the general formula

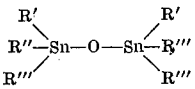

wherein R, R″, and R‴ are each alkyl radical containing 1 to 12 carbon atoms, stable to utlraviolet light, which comprises adding to a composition containing said organotin compound 0.5% to 2% by weight of phenyl salicylate based on the weight of said organotin compound.

---

This invention relates to a process for stabilizing organotin compounds having the general formula

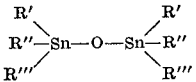

wherein R′, R″, and R‴ are each alkyl groups containing 1 to 12 carbon atoms, and to stabilized compositions containing such organotin compounds.

The organotin compounds represented by said general formula have excellent properties such as germicidal and antimold properties. They are applied widely as antimold substances and antiseptics for woods, bamboo, leather, and manufactures made of paper; toxic substances for ship bottom paint, agricultural chemicals, and sanitary processing agents in the manufactures of fiber. However, these organotin compounds may be somewhate unstable to light and heat, changeable in quality and decomposable into a white precipitate.

It has been found that bis-tri-n-butyltin oxide, which is transparent and oily, suffers a partial change into tetra-n-butyltin, which is lacking in germicidal properties and into a white precipitate of di-n-butyltin oxide when irradiated with ultraviolet rays. The di-n-butyltin oxide is not compatible with almost all of organic solvents.

It is an object of this invention to provide a light stable composition including bis(trialkyltin)oxide. Other objects will be apparent to those skilled in the art from consideration of the following description.

In accordance with certain of its aspects, this invention relates to an ultraviolet light stable compositions comprising an organotin compound having the general formula as shown below and 0.5% to 2% by weight of phenyl salicylate based on the weight of said organotin compound. Said organotin compounds may have the general formula

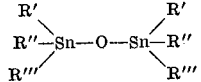

wherein R′, R″, and R‴ are each alkyl groups containing 1–12 carbon atoms.

In accordance with certain other of its aspects this invention relates to a process of rendering organotin compounds having the formula

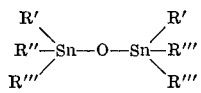

wherein R′, R″, and R‴ are each alkyl groups containing 1–12 carbton atoms, stable to ultraviolet light, which comprises adding to a composition containing said organotin compound 0.5% to 2% by weight of phenyl salicylate, based on the weight of said organotin compound.

The alkyl groups of the organotin compounds which may be stabilized against the effects of ultraviolet light in accordance with certain aspects of this invention include: straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, etc. Preferred alkyl includes lower alkyl, i.e., having less than about 8 carbon atoms, i.e., octyls and lower. R′, R″, and R‴ may be inertly subsituted, e.g., may bear a non-reatcive substituent such as aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. The groups R′, R″, and R‴ may be the same or different.

Typical organotin compounds which may be stabilized in accordance with this invention include:

bis(trimethyltin)oxide, bis(triethyltin)oxide,
bis(tri-n-propyltin)oxide, bis(tri-isopropyltin)oixde,
bis(tri-n-butyltin)oxide, bis(tri-isobutyltin)oxide,
bis(tri-n-amyltin)oxide, bis(tri-n-hexyltin)oxide,
bis(tri-n-octyltin)oixde, bis(tri-2-ethylhexyltin)oxide,
bis(tri-3,5,5-trimethylhexyltin)oxide,
bis(tri-chloromethyltin)oxide,
bis(butyldimethyltin)oxide,
bis(butyldiethyltin)oxide, bis(diethylhexyltin)oxide,
bis(dimethyloctyltin)oxide, bis(diethyloctyltin)oxide,
bis(diamylethyltin)oxide, bis(dodecyldimethyltin)oxide,
bis(dodecyldiethyltin)oxide, bis(tribenzyltin)oxide,
bis[tris(o-bromobenzyl)tin]oxide,
   bis[tris(o-chlorobenzyl)tin]-oxide.

The preferred compounds may typically be those in which R′, R″, and R‴ are the same and are lower alkyl. The most preferred organotin compounds which may be stabilized are the bis(tributyltin)oxides, say bis(tri-n-btuyltin)oxide.

In accordance with certain aspects of the invention the phenyl group of phenyl salicylate may be unsubstituted or substituted with an inert non-reactive substituent, e.g., alkyl, aryl, cycloalkyl, alkaryl, alkenyl, ether, halogen, nitro, ester, etc. Inertly substituted phenyl includes chlorophenyl, anisyl, biphenyl, 3-chloro-5-methylphenyl, 2,6-di-tert-butyl-4 chlorophenyl, etc. The preferred phenyl salicylate is unsubstituted phenyl salicylate se.

According to this invention, phenyl salicylate may maintain its stabilizing effect for a long period without tinting, and is easily compatible with the organotin compounds in amounts of 0.5%–2% by weight of the organotin compound at room temperature.

For the purpose of giving those skilled in the art a better understanding of the invention, the following illustrative example is set forth.

Example

Various quantities of phenyl salicylate may be added to well refined bis(tri-n-butyltin)oxide [purity 99.6%, specific gravity (20° C.) 1.174, index of refraction ($n_D^{20}$) 1.4872] and the composition exposed to a medium including ultraviolet light over a period of time. The results obtained are shown from Table I to Table III. Each mark in the tables shows the following conditions:

— shows the state wherein white turbidity and precipitate are not formed.
+ shows the state wherein white turbidity is formed.
++ shows the state wherein precipitate is formed.

TABLE I.—INDOOR TEST (18–27° C.)

| Concentration of additives (percent) | Changes with the elapsed days | | | | | | |
|---|---|---|---|---|---|---|---|
| | 2 | 5 | 10 | 15 | 20 | 25 | 30 |
| No addition (control) | + | + | ++ | ++ | ++ | ++ | ++ |
| 0.5 | — | — | — | — | — | — | — |
| 1.0 | — | — | — | — | — | — | — |
| 2.0 | — | — | — | — | — | — | — |

TABLE II.—RADIATION TEST IN SUNLIGHT

| Concentration of additives (percent) | Changes with the elapsed days | | | | | | |
|---|---|---|---|---|---|---|---|
| | 2 | 4 | 6 | 8 | 10 | 15 | 20 | 30 |
| No addition (control) | + | + | + | + | ++ | ++ | ++ | ++ |
| 0.5 | — | — | — | — | — | — | + | + |
| 1.0 | — | — | — | — | — | — | — | — |
| 2.0 | — | — | — | — | — | — | — | — |

TABLE III.—RADIATION TEST IN ULTRAVIOLET RAYS

| Concentration of additives (percent) | Changes with the elapsed days | | | | | |
|---|---|---|---|---|---|---|
| | 0.5 | 1 | 2 | 3 | 4 | 5 |
| No addition (control) | + | + | + | ++ | ++ | ++ |
| 0.5 | — | — | — | — | + | + |
| 1.0 | — | — | — | — | — | + |
| 2.0 | — | — | — | — | — | — |

The lamp employed may be Toshiba GL–15 ultraviolet rays lamp (wave length 2537 A.) used at a radiation distance of 25 cm.

Although this invention has been illustrated by reference to specific examples, numerous changes and modifications thereof which clearly fall within the scope of the invention will be apparent to those skilled in the art.

We claim:
1. A process for rendering organotin compound having the general formula

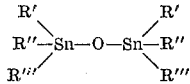

wherein R′, R″, and R‴ are each alkyl radical containing 1 to 12 carbon atoms, stable to ultraviolet light, which comprises adding to a composition containing said organotin compound 0.5% to 2% by weight of a phenyl salicylate based on the weight of said organotin compound.

2. A process for rendering organotin compound stable to ultraviolet light as claimed in claim 1 wherein R′, R″, and R‴ are each lower alkyl groups and are all the same.

3. A process for rendering organotin compound stable to ultraviolet light as claimed in claim 1 wherein said organotin compound is bis(tri-n-butyltin)oxide.

4. An ultraviolet light stable composition comprising an organotin compound having the general formula

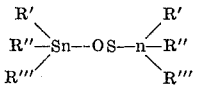

wherein R′, R″, and R‴ are each alkyl groups containing 1–12 carbon atoms and 0.5% to 2% by weight of a phenyl salicylate, based on the weight of said organotin compound.

5. An ultraviolet light stable composition as claimed in claim 4 wherein R′, R″, and R‴ are each lower alkyl groups and are all the same.

6. An ultraviolet light stable composition as claimed in claim 4 wherein said organotin compound is bis(tri-n-butyltin)oxide.

References Cited

UNITED STATES PATENTS 3,112,338 11/1963 Smutny et al. _____ 260—473
3,198,819 8/1965 Gloskey _____ 260—429.7

OTHER REFERENCES

Steiger, Chem. Abstracts (1961), vol. 56, p. 2572(a), QD1 A51 (Copy in Group 120 Library).

TOBIAS E. LEVOW, *Primary Examiner.*

W. F. W. BELLAMY, *Assistant Examiner.*

U.S. Cl. X.R.
106—15; 260—999